Jan. 19, 1971 HEIHACHI MITSUMOTO Re. 27,033

HYGROSCOPIC HAIR CURLER

Original Filed July 17, 1965 2 Sheets-Sheet 1

INVENTOR.
HEIHACHI MITSUMOTO
BY Herman L. Gordon
ATTORNEY

HYGROSCOPIC HAIR CURLER

Original Filed July 17, 1965 2 Sheets-Sheet 2

INVENTOR.
HEIHACHI MITSUMOTO
BY Herman L. Gordon
ATTORNEY

United States Patent Office

Re. 27,033
Reissued Jan. 19, 1971

27,033

HYGROSCOPIC HAIR CURLER

Heihachi Mitsumoto, 20 Nishi Oi 4–13,
Shinagawa-ku, Tokyo, Japan

Original No. 3,415,255, dated Dec. 10, 1968, Ser. No. 464,755, June 17, 1965. Application for reissue July 22, 1969, Ser. No. 848,761
Int. Cl. A45d *2/02*
U.S. Cl. 132—39 9 Claims

Matter enclosed in heavy brackets [ ] appears in the original patent but forms no part of this reissue specification; matter printed in italics indicates the additions made by reissue.

ABSTRACT OF THE DISCLOSURE

A hair curling device consisting af a cylindrical roller having a flanged spool-shaped core on the shank of which a layer of hygroscopic material is disposed, filling the space between the flanges of the core. A cover of fabric or other suitable fibrous material surrounds the core to retain the hygroscopic material. A roller-embracing clip is used with the device to retain rolled-up wet hair strands on the roller and to allow moisture to be absorbed from the hair strands by the hygroscopic material so that the strands will retain a curled configuration after they are dry.

This invention relates to hairdressing, and more particularly to a new and improved method and device for curling and waving hair without using complicated appliances or special waving or curling solutions.

Curled or waved hair has long been regarded as desirable and has been obtained by various methods, identified as "permanent waving." Early permanent waving involved expensive, lengthy and complicated operations. Subsequently, many improvements have been made in this process. An important development was the invention of a process called "cold wave." The cold wave process was very desirable for the reason that the hair was protected from burns and that curls and waves were obtained closely resembling natural ones. The cold wave is accomplished by rolling the hair on various types of curlers and steaming the hair by chemical action at ambient temperature. However, the cold wave process still requires a long time, and a special solution is necessary to treat the hair chemically. In the curling operation by the cold wave process, a multiple strand of hair is rolled on a curler, called a "rod," and is treated with a cold wave solution. The hair strands which have been saturated with the solution are left rolled on the rods for about 20 to 30 minutes. Then the hair is carefully washed to rinse off the solution. After rinsing and drying, the hair strands are rolled again on hair curlers to give a desired form to the hair, using a set lotion. The hair which has been moistened with the set lotion must be dried to obtain the last finish. The drying of the hair is effected by keeping the head in a dryer for a long time. In employing the dryer, it is necessary for a person to sit patiently until her hair is completely dried. Conventional hair dryers impose considerable discomfort on the user even if the operation is performed in a beauty salon which is provided with air conditioning equipment. This is due mainly to the fact that the user's head is exposed to a high temperature for a long time. Furthermore, since the solution employed for a cold wave uses chemicals, care must be taken to avoid damage to the scalp and hair by the chemical action. Therefore, hair dressing by the cold wave method can be carried out successfully and safely only by a skilled beautician. It is also true that it requires at least two hours to perform the cold wave hairdressing process.

Therefore, a principal object of the present invention is to provide a hairdressing method and device which avoids the use of a hot unpleasant dryer and a special solution, and to facilitate the achievement of a modren home permanent wave.

The present invention is based on the fact that moisture can soften hair sufficiently to permit changing its shape, and that rapid dehydration or drying of the wet hair causes it to retain its shape when a curl or wave is incorporated therein before drying.

In accordance with the present invention, when a person desires to have her hair curled or waved, she is required only to moisten her hair and roll it on a special rod member. It is not necessary to employ a special solution, such as one which might injure or damage the scape or hair. Washing of the hair or spraying water on the hair is enough to change the shape of the hair.

The present invention relies on the use of a hair curler, on which the hair is rolled, which has a special ability to rapidly and efficiently absorb moisture from the wet hair, whereby the hair will be dried by the curler itself and will be retained in its new curled or rolled form. Thus, the permanent waves can be obtained without using a special solution or an unpleasant hot dryer.

It is therefore another object of the invention to provide a novel means for curling hair and for drying same to impart a new form thereto.

When viewed under a microscope, human hair is seen to include scale-like shell particles. When the hair is dried by exposure to heat, the scale-like particles flare outwardly, whereby the hair presents a coarse surface. Such a coarse surface tends to absorb moisture and to collect dust. Thus, hair which has been dressed by the cold wave process, using a hot dryer, cannot retain its dressed-up form for any substantial length of time, and the hair and scalp tend to become easily soiled. In accordance with the present invention, the drying of the hair is not done by applying heat thereto, but at room temperature. When hair is dressed by the technique of the present invention, each strand has a smooth surface. Thus, it can retain its dressed-up form for a long time, and has a minimum tendency to become soiled.

The hygroscopic hair curler of the present invention may be of any desirable shape or form, such as cylindrical, disc-shaped, or in the form of a rollable pad, and may include elements made of cardboard, cloth, or other fibrous material. The hygroscopic material used may consist of silica gel, calcium chloride, kaolin, or any other suitable hygroscopic material.

The curler, after it has been saturated with moisture by the use thereof, may be dried by heating it or drying it sufficiently to recover its former hygroscopic nature. Thus, the curler of the present invention can be used repeatedly and economically.

The features of the invention together with the objects and advantages thereof will best be understood by reference to the following description, taken in connection with the accompanying drawing, showing an example of a typical form of hair curler according to the present invention, the curler being shown in perspective, with parts broken away to reveal details of internal construction.

Figure 1:
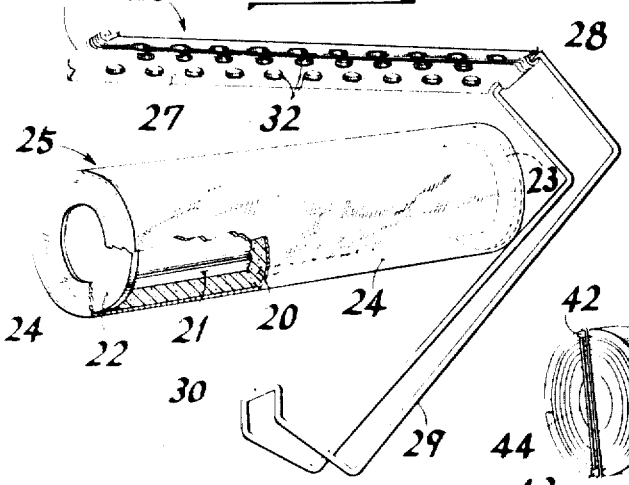
*FIG. 1 is a partial cut-away perspective view of a curler and clip.*
Figure 2:
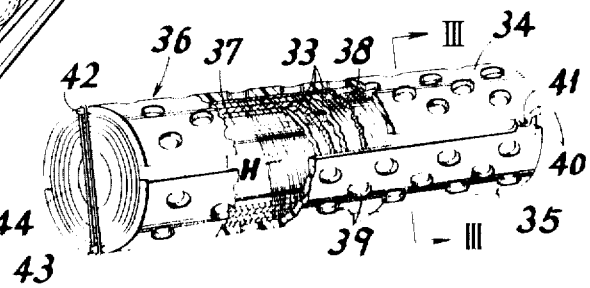
*FIG. 2 is a partial cut-away view of a curler and clip.*
Figure 3:
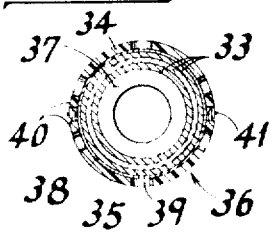
*FIG. 3 is a cross sectional view of the curler and clip of FIG. 2 taken through section line 3—3 of FIG. 2.*
Figure 4:
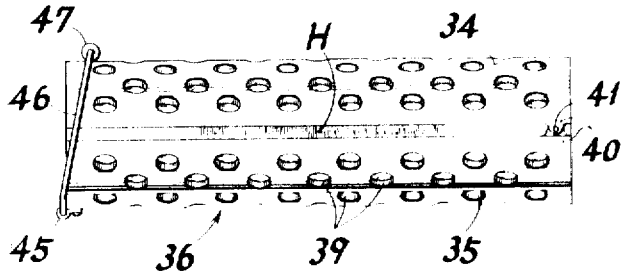
*FIG. 4 is a plan view of a clip engaging a curler.*
Figure 5:
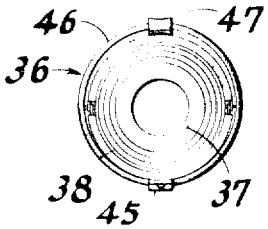
*FIG. 5 is an end view of the curler and clip of FIG. 4.*
Figure 6:
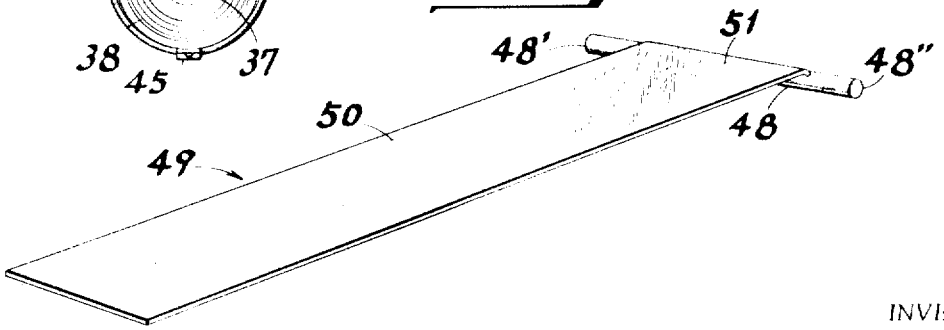
*FIG. 6 is an alternate embodiment of the curler which utilizes an elongated strip.*
Figure 7:
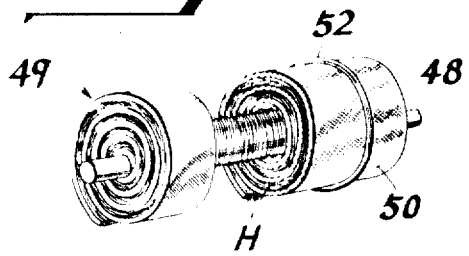
*FIG. 7 is a partial cut-away view of the curler illustrated in FIG. 6.*
Figure 8:
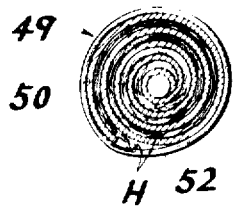
*FIG. 8 is an end view of the curler of FIGS. 6 and 7.*
Figure 9:
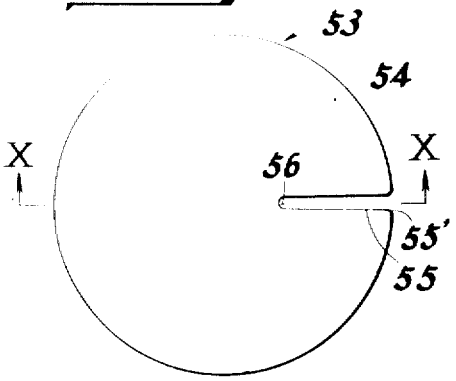
*FIG. 9 is an alternative embodiment of a curler wherein a flat disc like curler is illustrated in a plan view.*
Figure 10:
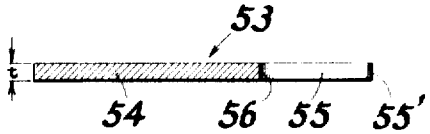
*FIG. 10 is a cross-sectional view of the curler of FIG. 9 taken through section line 10—10 of FIG. 9.*
Figure 11:
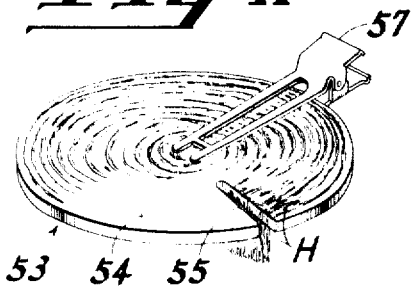
*FIG. 11 illustrates hair engaging the curler of FIG. 9 wherein the hair is held in place by a clip.*
Figure 12:
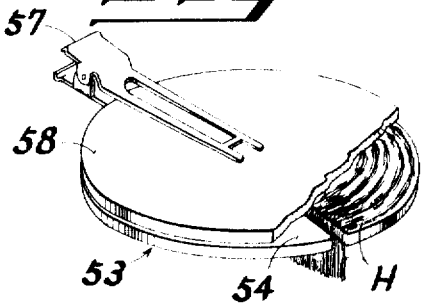
*FIG. 12 illustrates the curler of FIG. 9 wherein hair is engaging the curler and the hair is held in place by a disc and a curler.*
Figure 13:
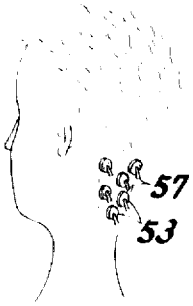
*FIG. 13 illustrates the curler of FIG. 4 being used by a woman.*

Referring now to the drawings, the curler comprises a generally cylindrical main curler body 25 and a clip device 26 adapted to longitudinally embrace the body 25 and to retain rolled-up wet hair strands thereon. The clip device 26 comprises a perforated channel member 27 having a wire bail 29 pivoted to one end thereof at 28, the bail having a transverse bight element 30 lockingly engageable over a catch lug 31 at the other end of member 27. Member 27 has the ventilation apertures 32 distributed thereover.

The cylindrical curler body 25 comprises a substantially rigid spool-shaped core having a cylindrical elongated main portion 21 provided with circular ends 22, defining annular flanges at the opposite ends of the core. A layer 20 of a suitable dessicating agent or dehydrating agent is disposed on portion 21, filling the space between the annular flanges. The dehydrating agent may comprise silica gel, calcium chloride, kaolin, or any other suitable hygroscopic material. The core may be made of cardboard or any other sufficiently rigid light material. The outer surface of the layer 20 is covered by a retaining cover 24 of fabric, strong paper, or similar fibrous material through which moisture can pass, the member 24 serving as a transmission medium for allowing moisture from the hair to pass to the layer 20 of dehydrating agent. The cover 24 extends over the end flanges of the core so as to retain the cover on the core. The cover acts to retain the dehydrating agent on the core body main portion 21. Said cover also improves the appearance of the curler.

The layer 20 may be fabricated in cylindrical form from pellet or powder material.

In the curling operations, the moist hair is rolled on the cylindrical curler 25 and is clipped by the clip device 26. The moisture of the hair is rapidly absorbed by the dehydrating agent in the layer 20. Thus, the wet hair will be quickly dried by the curler. When the hair is released from the curler by unfastening the clip device 26, the curled hair strands will retain their new rolled form. Accordingly, it is not necessary to employ an unpleasant hot dryer to obtain a permanent wave.

The used curlers, saturated with the absorbed moisture, can be reactivated to restore their former hygroscopic nature by heating and drying them, so that they can be used repeatedly, with accompanying economic advantages.

As above mentioned, the curls and waves formed by the present invention can retain their shape for a longer time than those formed by conventional curling or waving processes or devices, because hair dried by heating has a coarse surface, with flaring scale-like particles which tend to absorb moisture, softening the hair strands so that the curls and waves formed by these conventional processes or devices cannot retain their shape for a long time.

While a specific embodiment of a hair curler device has been disclosed in the foregoing description, it will be understood that various modifications within the spirit of the invention may occur to those skilled in the art. Therefore it is intended that no limitations be placed on the invention except as defined by the scope of the appended claims.

What I claim is:

1. A hair-drying curler device comprising a substantially cylindrical rigid spool-like body having an elongated main portion provided with circular end flanges, a layer of hygroscopic powder material on said entire main portion filling the space between said end flanges, and a cover of imperforate fibrous material through which moisture can pass secured to and surrounding said body and extending over said end flanges for retaining the layer of hygroscopic material on said elongated main body portion.

2. The hair-drying curler device of claim 1, wherein said cover is made of fabric.

3. The hair-drying curler device of claim 1, and wherein said hygroscopic material comprises silica gel.

4. The hair-drying curler device of claim 1, and wherein said hygroscopic material comprises calcium chloride.

5. The hair-drying curler device of claim 1, and wherein said hygroscopic material comprises kaolin.

*6. A hair-drying curler device comprising a substantially rigid elongated body; a layer of hygroscopic material on said body and a cover of imperforate fibrous material through which moisture can pass surrounding said hygroscopic material for contacting wet hair and distributing moisture from said hair over said hygroscopic material.*

*7. The hair-drying curler defined in claim 6 wherein said cover is made of fabric.*

*8. The hair-drying curler defined in claim 6 wherein said hygroscopic material comprises a powder.*

*9. The hair-drying curler defined in claim 6 wherein said hygroscopic material consists of a member of the group silica gel, calcium chloride and kaolin.*

References Cited

The following references, cited by the Examiner, are of record in the patented file of this patent or the original patent.

UNITED STATES PATENTS

| | | | |
|---|---|---|---|
| 2,394,224 | 2/1946 | Altman | 132—7 |
| 2,646,053 | 7/1953 | Harris | 132—38X |
| 2,757,676 | 8/1956 | Hamilton | 132—42.1 |

FOREIGN PATENTS 952,298 11/1956 Germany.

LOUIS G. MANCENE, Primary Examiner

G. E. McNEILL, Assistant Examiner